United States Patent
Yoo et al.

(10) Patent No.: US 9,286,693 B2
(45) Date of Patent: Mar. 15, 2016

(54) METHOD AND APPARATUS FOR DETECTING ABNORMAL MOVEMENT

(71) Applicants: HANWHA TECHWIN CO., LTD., Changwon-Si (KR); Seoul National University Industry Foundation, Seoul (KR)

(72) Inventors: Young Joon Yoo, Changwon (KR); Ha Wook Jeong, Changwon (KR); Kwang Moo Yi, Changwon (KR); Jin Young Choi, Changwon (KR); Dong Jun Park, Changwon (KR); Jeong Eun Lim, Changwon (KR)

(73) Assignees: Hanwha Techwin Co., Ltd., Changwon-si (KR); Seoul National University Industry Foundation, Seoul (KR)

( * ) Notice: Subject to any disclaimer, the term of this patent is extended or adjusted under 35 U.S.C. 154(b) by 0 days.

(21) Appl. No.: 14/161,890

(22) Filed: Jan. 23, 2014

(65) Prior Publication Data

US 2014/0241619 A1 Aug. 28, 2014

(30) Foreign Application Priority Data

Feb. 25, 2013 (KR) .................. 10-2013-0020130
Aug. 5, 2013 (KR) .................. 10-2013-0092658

(51) Int. Cl.
G06K 9/62 (2006.01)
G06T 7/20 (2006.01)
G06K 9/00 (2006.01)

(52) U.S. Cl.
CPC .......... *G06T 7/2033* (2013.01); *G06K 9/00771* (2013.01); *G06K 9/00785* (2013.01);

(Continued)

(58) Field of Classification Search
CPC ............ G06K 9/00771; G06K 9/3241; G06K 9/00765; G06K 9/00805; G06K 9/00523; G06K 9/00335; G06K 9/00228; H04N 5/23254; H04N 5/23267; H04N 2013/0081; H04N 5/144; H04N 5/145; G06T 7/2033; G06T 7/204; G06T 2207/20076; G06T 7/2006; G06T 7/20; G06T 2207/30241; G01N 21/956; G06Q 10/0833; G01S 3/7865; G08B 21/0423; A61B 5/0452
USPC ................. 382/103, 118, 154, 159, 190, 195; 348/155, 169, 180, 208
See application file for complete search history.

(56) References Cited

U.S. PATENT DOCUMENTS 6,072,903 A * 6/2000 Maki ...................... G06T 7/2033
348/169
6,115,480 A * 9/2000 Washizawa ............... G06T 5/20
382/103

(Continued)

OTHER PUBLICATIONS

Jeong, et al., "Unsupervised Motion Learning for Abnormal Behavior Detection in Visual Surveillance", Published Thesis, Sep. 2011, total 7 pages.

(Continued)

*Primary Examiner* — Vu Le
*Assistant Examiner* — Aklilu Woldemariam
(74) *Attorney, Agent, or Firm* — Sughrue Mion, PLLC (57) ABSTRACT

Provided are a method and apparatus for detecting an abnormal movement. The apparatus includes a feature tracing unit configured to extract features of a moving object in an input image, trace a variation in position of the extracted features according to time, and ascertain trajectories of the extracted features; a topic online learning unit configured to classify the input image in units of documents which are bundles of the trajectories, and ascertain probability distribution states of topics, which constitute the classified document, by using an online learning method which is a probabilistic topic model; and a movement pattern online learning unit configured to learn a velocity and a direction for each of the ascertained topics, and learn a movement pattern by inferring a spatiotemporal correlation between the ascertained topics.

21 Claims, 10 Drawing Sheets

(52) U.S. Cl.
CPC ............ *G06K9/6226* (2013.01); *G06K 9/6297*
(2013.01); *G06K 9/62* (2013.01); *G06T 2207/10016* (2013.01); *G06T 2207/20076* (2013.01); *G06T 2207/20081* (2013.01); *G06T 2207/30241* (2013.01)

(56) References Cited

U.S. PATENT DOCUMENTS

| | | | | |
|---|---|---|---|---|
| 6,728,404 | B1* | 4/2004 | Ono | G06K 9/3241 |
| | | | | 382/118 |
| 8,169,481 | B2* | 5/2012 | Ozdemir | G06K 9/00335 |
| | | | | 348/143 |
| 8,619,135 | B2* | 12/2013 | Shellshear | H04N 7/18 |
| | | | | 348/135 |
| 8,699,748 | B2* | 4/2014 | Huang | G06T 7/208 |
| | | | | 348/169 |
| 8,724,891 | B2* | 5/2014 | Kiryati | G06T 7/208 |
| | | | | 348/143 |
| 2003/0021465 | A1* | 1/2003 | Adel | G03F 7/70633 |
| | | | | 382/151 |
| 2005/0196015 | A1* | 9/2005 | Luo | G06K 9/00234 |
| | | | | 382/103 |
| 2007/0230770 | A1* | 10/2007 | Kulkarni | G06F 17/5045 |
| | | | | 382/149 |
| 2008/0166024 | A1* | 7/2008 | Iketani | B60R 1/00 |
| | | | | 382/107 |
| 2009/0016610 | A1* | 1/2009 | Ma | G06K 9/00771 |
| | | | | 382/195 |
| 2009/0112588 | A1* | 4/2009 | Kummamuru | G10L 15/04 |
| | | | | 704/245 |
| 2010/0207762 | A1* | 8/2010 | Lee | G06K 9/00771 |
| | | | | 340/541 |
| 2011/0043636 | A1 | 2/2011 | Lazar et al. | |
| 2011/0137898 | A1* | 6/2011 | Gordo | G60F 17/30011 |
| | | | | 707/737 |
| 2012/0170802 | A1* | 7/2012 | Millar | G06K 9/00785 |
| | | | | 382/103 |
| 2012/0237081 | A1* | 9/2012 | Datta | G06K 9/00778 |
| | | | | 382/103 |
| 2012/0294511 | A1* | 11/2012 | Datta | G06K 9/00771 |
| | | | | 382/155 |
| 2012/0321145 | A1* | 12/2012 | Saito | G06F 17/30256 |
| | | | | 382/118 |
| 2013/0030875 | A1* | 1/2013 | Lee | G06Q 10/06311 |
| | | | | 705/7.38 |
| 2013/0169822 | A1* | 7/2013 | Zhu | G06T 7/0018 |
| | | | | 348/180 |
| 2013/0223686 | A1* | 8/2013 | Shimizu | G06K 9/00624 |
| | | | | 382/103 |
| 2013/0243252 | A1* | 9/2013 | Xu | H04N 7/002 |
| | | | | 382/103 |
| 2014/0132786 | A1* | 5/2014 | Saitwal | H04N 5/23267 |
| | | | | 348/208.99 |

OTHER PUBLICATIONS

Hoffman, et al., "Online Learning for Latent Dirichlet Allocation", 2010, total 9 pages.

Wang, et al., "Motion Clustering and Object Detection via Modulated Integral Imaging", 2009 International Conference on Optical Instruments and Technology: Optoelectronic Imaging and Process Technology, total 6 pages, Proc. of SPIE vol. 7513 75130S.

* cited by examiner

METHOD AND APPARATUS FOR DETECTING ABNORMAL MOVEMENT

CROSS-REFERENCE TO RELATED APPLICATIONS

This application claims priority from of Korean Patent Application No. 10-2013-0020130, filed on Feb. 25, 2013 and Korean Patent Application No. 10-2013-0092658, filed on Aug. 5, 2013, in the Korean Intellectual Property Office, the disclosures of which are incorporated herein in their entirety by reference.

BACKGROUND

1. Field

The present disclosure relates to a method and apparatus for detecting abnormal movement by using an online learning method.

2. Description of the Related Art

A method of learning a movement flow of an object in an image is roughly classified as either a trajectory-based learning method or a local feature-based learning method. These learning methods may be roughly classified into three types of methods:

First, there is a method of learning an image by tracing moving objects in an image to search for trajectories thereof and by clustering the trajectories as several main patterns. In this first type of method, a distance between the trajectories is defined so that similar trajectories are separated from each other at a short distance, and the similar trajectories are classified as the respective patterns by using the defined distance.

Second, there is a method of learning an image by defining a transition probability from each pixel to the next pixel of an image by using a Gaussian mixture model and Kernel density estimation. Rather than searching for an ordinary pattern of a trajectory, in this second type of method, the velocity and size of an object that passes through each position of an image are statistically learned. When compared with the above-mentioned first type of method, the second type of method has a performance that more robust to an image projected at an arbitrary angle. Also, the second type of method may further effectively process a trajectory that is cut off.

Third, there is a method of learning an image by extracting local features, such as an optical flow, from an image. In this third type of method, a learning model is generated using a Gaussian mixture model or a probabilistic topic model.

However, since these learning methods generally use a batch learning scheme, in a situation where an image continuously varies, the variation may not be reflected in a learning model.

Korean Patent Publication No. 2011-0133476 is an example of the related art.

SUMMARY

One or more exemplary embodiments of the present disclosure include a method of allowing learning to be performed even when a plurality of normal movement patterns occur with a time difference in an arbitrary local area in an input image.

One or more exemplary embodiments of the present disclosure may include a method of detecting an abnormal behavior. The method may allow the velocity and direction information of features in an image to be learned and may allow a spatiotemporal relationship between patterns to be ascertained.

One or more exemplary embodiments of the present disclosure may include a method of detecting an abnormal behavior. The method may be adapted to a variation in an image according to time variation and may have a robust performance even for a complex image, such as a crowd concentration image.

Additional aspects will be set forth in and apparent from the following description.

According to one or more exemplary embodiments of the present disclosure, an apparatus for detecting an abnormal movement may include a feature tracing unit for extracting features of a moving object in an input image, tracing a variation in position of the extracted features according to time, and ascertaining trajectories of the extracted features; a topic online learning unit for classifying the input image in units of documents which are bundles of the trajectories, and ascertaining probability distribution states of topics, which constitute the classified document, by using an online learning method which is a probabilistic topic model; and a movement pattern online learning unit for learning a velocity and a direction for each of the ascertained topics, and learning a movement pattern by inferring a spatiotemporal correlation between the ascertained topics.

According to one or more exemplary embodiments of the present disclosure, an apparatus for detecting an abnormal movement may include a feature tracing unit for extracting features of a moving object in an input image, tracing a variation in position of the extracted features according to time, and ascertaining trajectories of the extracted features; a trajectory classifying unit for classifying the input image in units of documents indicating a bundle of the trajectories, and inferring a multinomial distribution parameter probability vector value indicating histogram distribution of topics constituting each document by using an online learning method which is a probabilistic topic model to thus cluster positions of the trajectories for each topic in the document; a spatiotemporal correlation inferring unit for inferring a spatiotemporal correlation on the basis of the inferred multinomial distribution parameter probability vector value; and a movement pattern online learning unit for learning a velocity and a direction for each of the clustered topics, and learning a movement pattern by inferring a spatiotemporal correlation between the ascertained topics.

The apparatus may further include an abnormality detecting unit that, when the trajectories comprised in each frame of the input image have a low probability of being comprised in the learned movement pattern, classifies the movement pattern as an abnormal movement pattern by using a Gaussian learning result of the learned movement pattern.

The trajectory may be expressed by a set of words $w_{ji}$ and a set of vector differences $v_{ji\tau}$, and a set of the words represents a set of words indicating positions of grid points through which the trajectories pass. The set of vector differences represents a set of differences $v_{ji\tau}$ in vector between a position of an actual feature in the word and a position of the actual feature before $\tau$ frames, and $w_{ji}$ indicates that a j-th trajectory passes through an i-th grid.

The multinomial distribution parameter probability vector value may include probability distribution ($\theta_d$) and topic-word probability distribution ($\phi_k$).

The spatiotemporal correlation inferring unit may infer a spatiotemporal correlation using a K-means clustering method.

According to one or more exemplary embodiments of the present disclosure, a method of detecting an abnormal movement may include extracting features of a moving object in an input image, tracing a variation in position of the extracted features according to time, and ascertaining trajectories of the extracted features, in a feature tracing unit; classifying the input image in units of documents which are bundles of the trajectories, and ascertaining probability distribution states of topics, which constitute the classified document, by using an online learning method which is a probabilistic topic model, in a topic online learning unit; and learning a velocity and a direction for each of the ascertained topics, and learning a movement pattern by inferring a spatiotemporal correlation between the ascertained topics, in a topic online learning unit.

According to one or more exemplary embodiments of the present disclosure, a method of detecting an abnormal movement may include extracting features of a moving object in an input image, tracing a variation in position of the extracted features according to time, and ascertaining trajectories of the extracted features, in a feature tracing unit; classifying the input image in units of documents indicating a bundle of the trajectories, and inferring a multinomial distribution parameter probability vector value indicating histogram distribution of topics constituting each document by using an online learning method which is a probabilistic topic model to thus cluster positions of the trajectories for each topic in the document, in a trajectory classifying unit; inferring a spatiotemporal correlation on the basis of the inferred multinomial distribution parameter probability vector value in a spatiotemporal correlation inferring unit; and learning a velocity and a direction for each of the clustered topics, and learning a movement pattern by inferring a spatiotemporal correlation between the ascertained topics, in a movement pattern online learning unit.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

The block diagrams in the figures illustrate apparatuses and methods according to the exemplary embodiments of the present disclosure. In this regard, each block may represent a module, a program, or a part of code, which contains one or more executable instructions for performing specified logic functions. It should also be noted that block diagrams may be implemented by a dedicated hardware-based system for performing specified functions/operations, by a software-based system for performing specified functions/operations, or by a combination of dedicated hardware and computer instructions.

Figure 1:
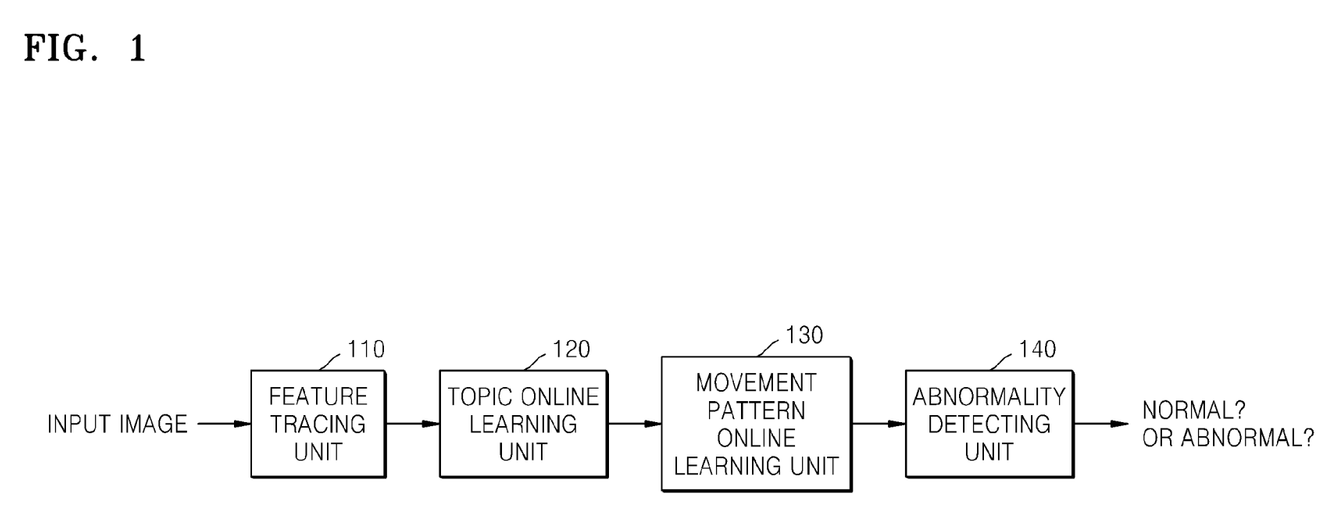
FIG. 1 is an internal configuration diagram of an abnormal behavior detecting apparatus according to an exemplary embodiment of the present disclosure.

FIG. 1 is an internal configuration diagram of an abnormal behavior detecting apparatus 100 according to an exemplary embodiment of the present disclosure.

The abnormal behavior detecting apparatus 100 includes a feature tracing unit 110, a topic online learning unit 120, a movement pattern online learning unit 130, and an abnormality detecting unit 140.

For example, when an input image is series of frames depicting vehicle traffic, the feature tracing unit 110 extracts features of a moving object, e.g., a car, in the input image and traces positional variations of the extracted features according to time in order to ascertain trajectory information.

In the exemplary embodiment of the present disclosure, the feature tracing unit 110 classifies the trajectory information in the input image according to main topics (for example, direct advance trajectory information, left turn trajectory information, right turn trajectory information, U-turn trajectory information, and the like). The feature tracing unit 110 classifies this trajectory information by using a Kanade-Lucas-Tomasi (KLT) tracing technique. As described below with reference FIG. 3, the feature tracing unit 110 learns areas, velocities, and the like by using this classified trajectory information.

The topic online learning unit 120 classifies the trajectory information ascertained by the feature tracing unit 110 according to main topics such as, for example, a horizontal direction direct advance trajectory, a left turn trajectory, a U-turn trajectory, or a vertical direction direct advance trajectory.

For this, as described below with reference to FIGS. 2A and 2B, the topic online learning unit 120 classifies the input image in units of documents indicating a bundle of trajectories, and ascertains a probability distribution state of a topic in which words constituting the classified document are included, by using an online learning method which is a probabilistic topic model. For example, each frame of the input image may be divided into a grid, and the position of the grid through which the trajectory passes is expressed by a word.

Thereafter, the movement pattern online learning unit 130 learns an area, a velocity, and a direction for each topic ascertained by the topic online learning unit 120. The movement pattern online learning unit 120 infers a spatiotemporal correlation between the ascertained topics. The spatiotemporal correlation may be inferred by using a K-means clustering method. For example, as described below with reference to FIG. 5, in a case where a U-turn occurs after a left turn, a movement pattern is learned by inferring the spatiotemporal correlation between a U-turn and a left turn.

When a trajectory included in each frame of an input image deviates from the predefined movement pattern learned by the movement pattern online learning unit 130, the abnormality detecting unit 140 determines that an abnormal behavior occurs. When there is a low possibility of a trajectory included in each frame of an input image corresponding to the learned movement pattern, the abnormality detecting unit 140 determines the movement pattern of the trajectory included in a frame to be an abnormality based on a Gaussian learning result (refer to Expressions 10 to 12) of the movement pattern learned by the movement pattern online learning unit 130. On the other hand, when a trajectory included in each frame of an input image does not deviate from the predefined movement pattern learned by the movement pattern online learning unit 130, the abnormality detecting unit 140 determines that a normal behavior occurs.

Figure 2A:
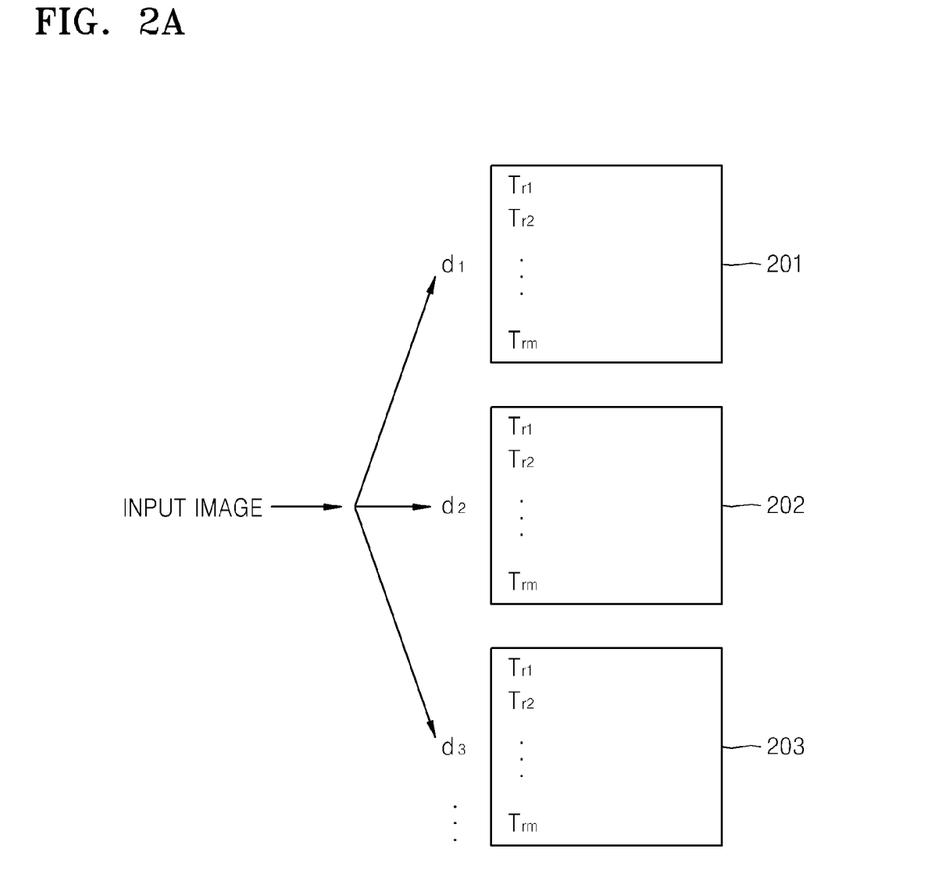
FIGS. 2A and 2B are diagrams illustrating an example in which an input image is classified in units of documents by using an online Latent dirichlet allocation (OLDA) learning method and probability distribution states of topics constituting the classified document are ascertained, according to an exemplary embodiment of the present disclosure.
Figure 2B:
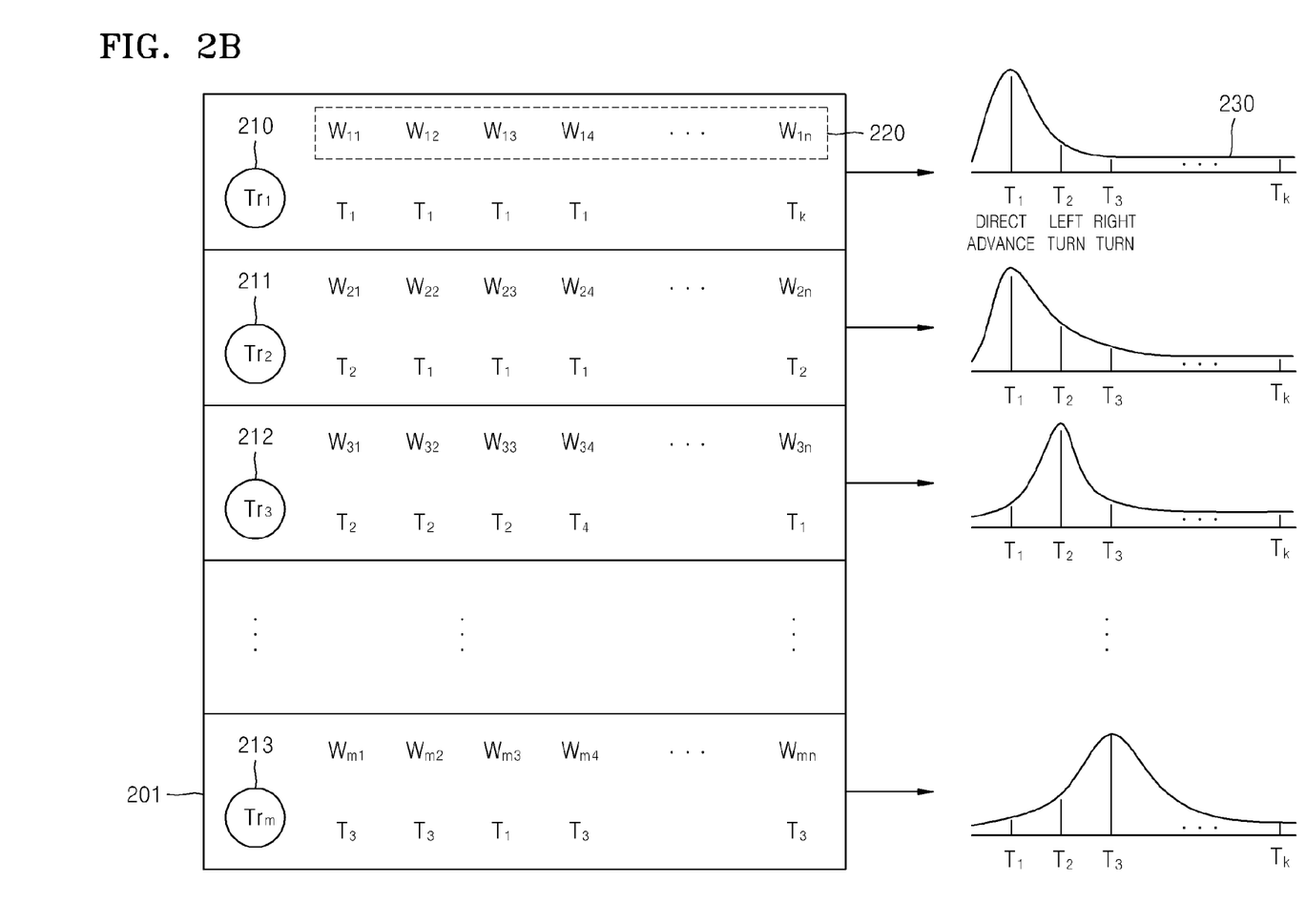

FIGS. 2A and 2B are diagrams illustrating an example in which an input image is classified in units of documents by using an online Latent dirichlet allocation (OLDA) learning method in the topic online learning unit 120 (see FIG. 1) and probability distribution states of topics constituting the classified document are ascertained, according to an exemplary embodiment of the present disclosure.

An OLDA is a probabilistic topic model that is mainly used in a natural language processing field. The OLDA is a technique of classifying a plurality of documents according to topics and determining in which topic words in the document are included. The OLDA is also currently used in various ways not only in the natural language processing field but also in a computer image processing field.

In the exemplary embodiment of the present disclosure, an OLDA learning method, which uses variational bayes (VB) as an online learning method, is used.

By using an OLDA learning method, even when a situation of an input image continuously varies, the variation may be reflected in a learning model and output results may be continuously updated according to sequential inputs.

In addition, by using the OLDA learning method, even when a plurality of normal movement patterns occur with a time difference in an arbitrary local area in an input image, the movement patterns may be learned.

Referring to FIG. 2A, in the exemplary embodiment of the present disclosure, an input image is classified into units of documents, for example, documents d1 201, d2 202, and d3 203, each indicate a bundle of trajectories $Tr_1$ to $Tr_m$. In this case, the document d1 201, the document d2 202, and the document d3 203 are constituted by a bundle of m trajectories (m is a natural number).

FIG. 2B is a diagram illustrating obtained by using an online learning method which is a probabilistic topic model. This diagram is an example of probability distribution states of topics having words constituting the classified document.

According to the exemplary embodiment of the present disclosure, the document d1 201 is constituted by trajectories $Tr_1$ to $Tr_m$ 210 to 213, respectively. The trajectory $Tr_1$ 210 is constituted by a set of words 220 indicating positions of the trajectories.

Specifically, each frame of the input image is divided into an n by n grid. The position of the grid through which the trajectory passes is expressed by a word. For example, when a j-th trajectory passes through an i-th grid, the position of the grid is expressed by $W_{ji}$. In this manner, the j-th trajectory is expressed by the set of words 220 ($W_{ji}$, i=1, 2, . . . , n). Thereafter, a probability distribution indicating which topic words are included in each trajectory is ascertained by using the online learning method which is a probabilistic topic model.

In this case, it is assumed that the document indicating a bundle of trajectories is constituted by a plurality of topics generated by multinomial distribution. In addition, it is assumed that the trajectories constituting an input image are included in one of latent topics representing representative K flows in the input image.

Referring to the probability distribution 230 of FIG. 2B, it is clear that the set of words 220 ($W_{1i}$, i=1, 2, . . . , n) constituting the trajectory $Tr_1$ 210 is highly likely to include a first topic T1 (direct advance trajectory).

Similarly, the trajectory $Tr_2$ 211 is also shown to be highly likely to be included in the first topic T1 (direct advance trajectory), the trajectory $Tr_3$ 212 is shown to be highly likely to be included in a second topic T2 (left turn trajectory), and the trajectory $Tr_m$ 213 is shown to be highly likely to be included in a third topic T3 (right turn trajectory).

In the exemplary embodiment of the present disclosure, as described in the exemplary embodiment of FIG. 2B, an input image is classified in units of documents indicating a bundle of trajectories, and probability distribution states of topics in which words constituting the document are included are ascertained. In this manner, positions of the trajectories may be clustered for each topic. For example, the trajectories may be classified according to topics with respect to the whole input image. The trajectories included in the first topic T1 (direct advance trajectory) may be clustered as the trajectory $Tr_1$ 210, the trajectory $Tr_2$ 211, . . . , the trajectories included in the second topic T2 (left turn trajectory) may be clustered as the trajectory $Tr_3$ 212, . . . , and the trajectories included in the third topic T3 (right turn trajectory) may be clustered as the trajectory $Tr_m$ 213, . . . . In this manner, the distribution of the topic that the most frequently occurs in the input image according to time zones, and the positions of the trajectories for each topic may be analyzed.

Figure 3:
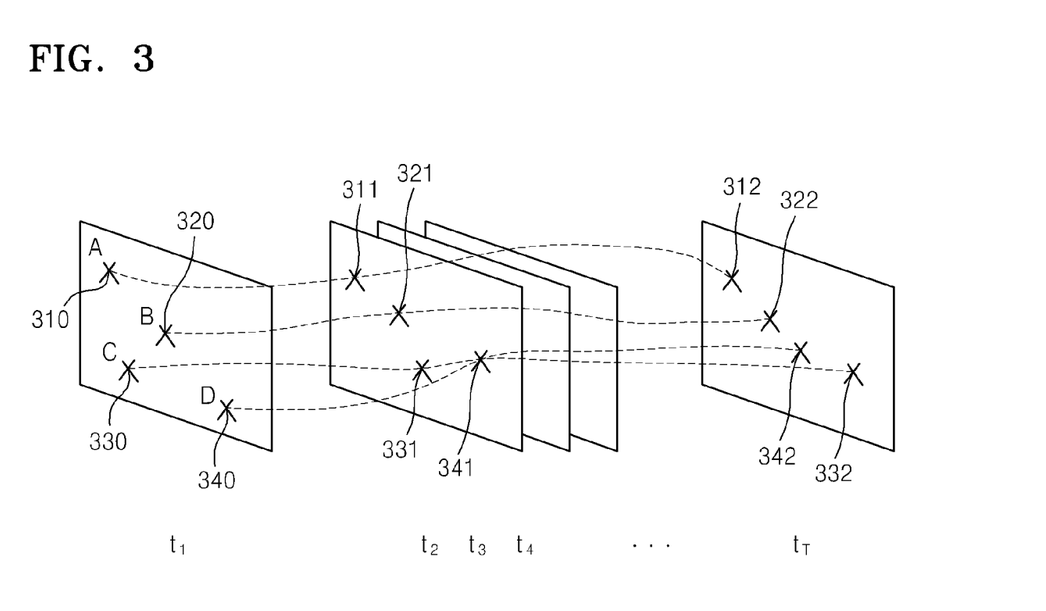
FIG. 3 is a diagram illustrating an example in which features of a moving object in an input image are extracted and trajectory information is ascertained by tracing variations in position of the extracted features according to time, according to an exemplary embodiment of the present disclosure.

FIG. 3 is a diagram illustrating an example in which features of a moving object in an input image are extracted and trajectory information is ascertained by tracing positional variations of the extracted features according to time.

Referring to FIG. 3, a feature A 310, a feature B 320, a feature C 330, and a feature D 340 are extracted from an input image of t1. Then, positional variations of these extracted features are traced according to time.

For example, the position of the feature A is changed to 310, 311, and 312 according to time. In addition, the position of the feature B is changed to 320, 321, and 322, the position of the feature C is changed to 330, 331, and 332, and the position of the feature D is changed to 340, 341, and 342. These variations in position of the features are traced.

Figure 4:
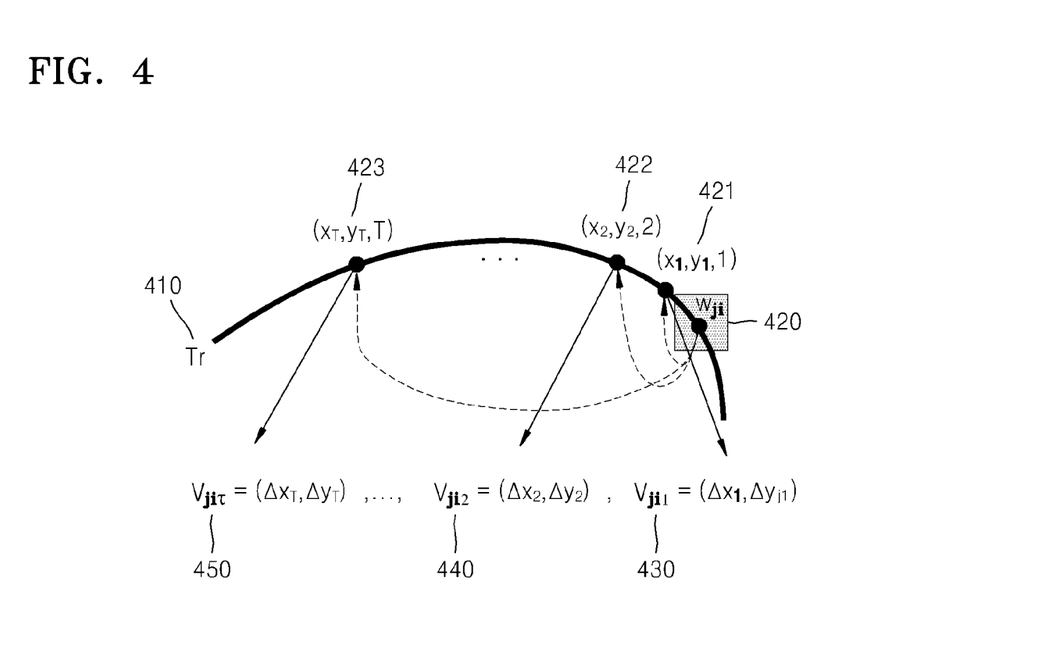
FIG. 4 is a diagram illustrating an example of a method of illustrating pieces of trajectory information, according to an exemplary embodiment of the present disclosure.

FIG. 4 is a diagram illustrating an example of a method of illustrating pieces of trajectory information, according to an exemplary embodiment of the present disclosure.

Trajectory Tr 410={$(x_1,y_1,1),(x_2,y_2,2),(x_3,y_3,3),(x_4,y_4,4) \ldots ,(x_T,y_T,T)$}

Referring to FIG. 4, the trajectory $Tr_1$ 410 is expressed by a set of words $w_{ji}$ and a set of vector differences $v_{ji\tau}$. The set of words $w_{ji}$ refers to a set of words expressing positions of grid points through which trajectories pass in an input image. Referring to FIG. 4, a $w_{ji}$ 420 indicates that a j-th trajectory passes through an i-th grid, and the j-th trajectory is expressed by a set of words ($W_{ji}$, i=1,2, ..., $N_j$).

A set of vector differences represents a set of differences $v_{ji\tau}$ in vector value between a position 420 of an actual feature within the word and the position of the actual feature before τ frames.

Referring to FIG. 4, the set of vector differences is expressed by a set of a vector difference $v_{ji1}$ 430 between the position 420 of the actual feature and a position $(x_1, y_1, 1)$ 421 before one frame, a vector difference $v_{ji2}$ 440 between the position 420 of the actual feature and a position $(x_2, y_2, 2)$ 422 before two frames, and a vector difference $v_{ji\tau}$ 450 between the position 420 of the actual feature and a position $(x_T, y_T, T)$ 423 before τ frames. Preferably, the vector difference $v_{ji\tau}$ 450 has Gaussian distribution and is expressed in the form of $N(\mu,\Sigma)$, as described with reference to Expression 6 below.

In this case, the vector differences may be expressed as $v_{ji1}=(\Delta x_{ji1}, \Delta y_{ji1}), v_{ji2}=(\Delta x_{ji2}, \Delta y_{ji2}), \ldots, v_{ji\tau}=(\Delta x_{ji\tau}, \Delta y_{ji\tau})$.

A Gaussian distribution may indicate a distance at which words are separated from each other before τ frames for each topic. The Gaussian distribution may be ascertained by using information regarding the vector difference $v_{ji\tau}$ between the position of the actual feature through which the trajectories pass within the word and the position of the actual feature before τ frames.

Figure 5:
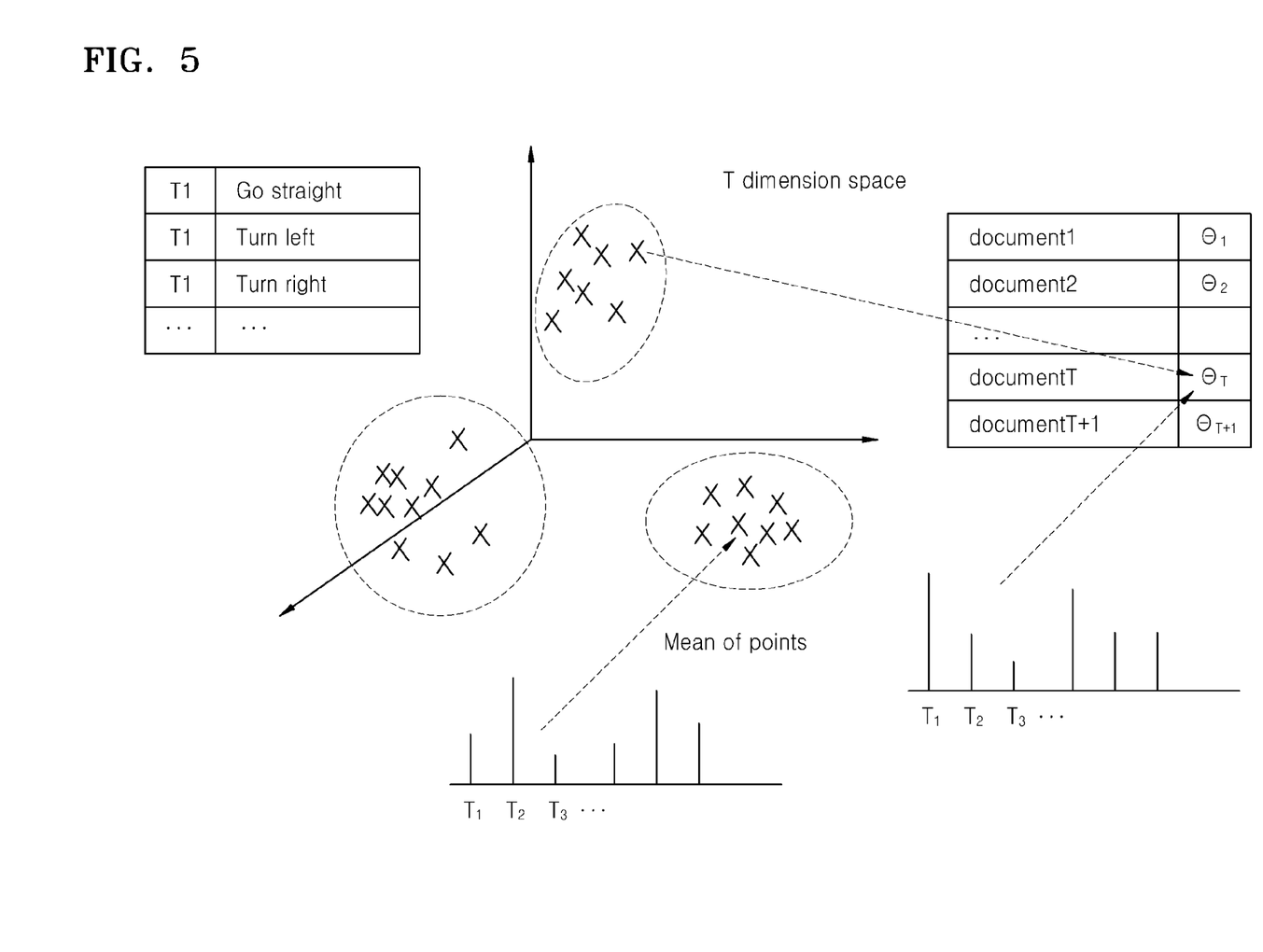
FIG. 5 is a diagram illustrating an example in which a spatiotemporal correlation is ascertained using a K-means clustering method, according to an exemplary embodiment of the present disclosure.

FIG. 5 is a diagram illustrating an example in which a spatiotemporal correlation is ascertained using a K-means clustering method, according to an exemplary embodiment of the present disclosure.

A probability distribution $\theta_d$ between a document and a topic may be ascertained using a K-means clustering method, as described below in detail with reference to FIG. 8B.

Figure 6:
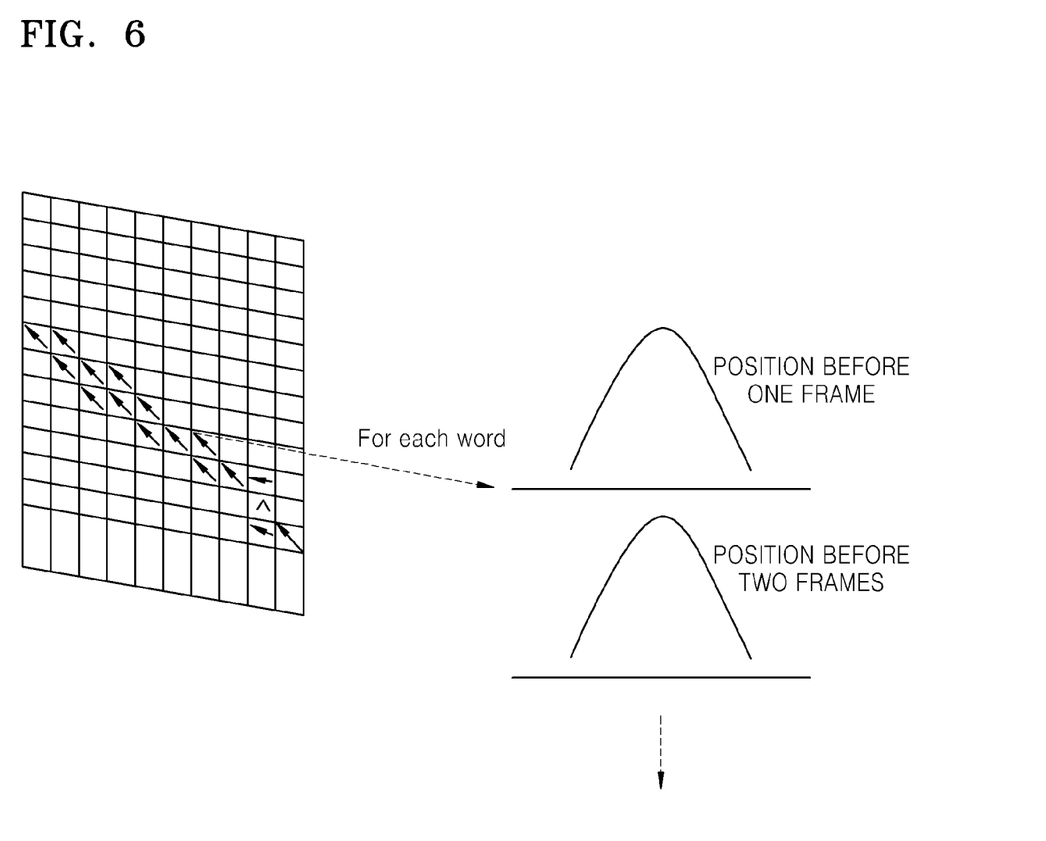
FIG. 6 is a diagram illustrating an example in which movement patterns are learned by inferring a spatiotemporal correlation between topics, according to an exemplary embodiment of the present disclosure.

FIG. 6 is a diagram illustrating an example in which movement patterns are learned by inferring a spatiotemporal correlation between topics, according to an exemplary embodiment of the present disclosure.

Figure 7:
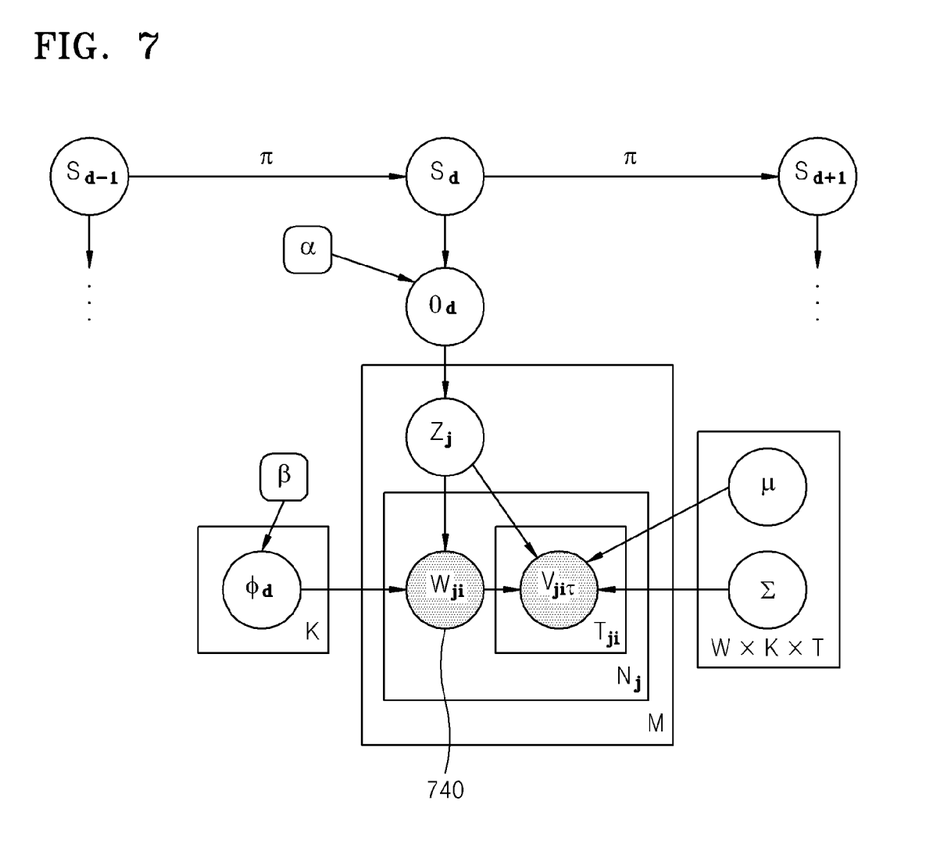
FIG. 7 is a diagram illustrating a type of graphic of an online learning method which is a probabilistic topic model, according to an exemplary embodiment of the present disclosure.

In the exemplary embodiment of the present disclosure, as described above, an online learning model as illustrated in FIG. 7 is used to learn an area, a velocity, and a direction for each topic, and to learn movement patterns by inferring a spatiotemporal correlation between the ascertained topics.

FIG. 7 is a diagram illustrating a type of graphic of an online learning method which is a probabilistic topic model, according to an exemplary embodiment of the present disclosure.

In the exemplary embodiment of the present disclosure, trajectories ascertained based on a KLT tracing technique are deformed into the form of an online learning model based on the probabilistic topic model illustrated in FIG. 7 by using Expressions 1 to 6, described below.

In a process of the online learning method, it is assumed that a trajectory $z_j$ is included in a latent topic representing representative K flows in an input image. Latent topics are main movement patterns, such as a direct advance, a left turn, etc., in an image.

In addition, it is assumed that a document indicating a bundle of trajectories is constituted by a plurality of topics generated by multinomial distribution. As such, a probability distribution of the topics in the document is associated with a parameter probability vector $\theta_d$ of the multinomial distribution which is generated by a state $s_d$. Here, the state $s_d$ refers to a set of behavior topics that occur for each unit of time. Accordingly, when state transition according to time is ascertained, main behaviors over time may be ascertained.

In the probabilistic topic model according to the exemplary embodiment of the present disclosure, Expressions 1 to 6 are used.

$$s_d|s_{d-1} \sim \text{Multi}(\pi_{s_{d-1}}), \qquad (1)$$

In Expression 1, $s_d$ denotes a current state, $s_{d-1}$ denotes a previous state, and Multi( ) denotes multinomial distribution. The state $s_d$ has information on what movement patterns (or topics) are generated mainly in an order d.

Expression 1 indicates whether a certain state $s_d$ appearing in the current order d is influenced by only a certain previous state $s_{d-1}$ in the previous order d−1.

$$\theta_d|s_d \sim \text{Dir}(\alpha), \qquad (2)$$

In Expression 2, $s_d$ denotes a current state, $\theta_d$ denotes a parameter probability vector of multinomial distribution, Dir( ) denotes dirichlet distribution, and α denotes a hyper-parameter of the dirichlet distribution.

Expression 2 indicates that $\theta_d$ is expressed in the form of a probability indicating a certain distribution when the whole model is assumed to be Bayesian.

$$\phi_k \sim \text{Dir}(\beta), \qquad (3)$$

In Expression 3, $\phi_k$ denotes word-topic distribution, Dir( ) denotes dirichlet distribution, and β denotes a hyper parameter of the dirichlet distribution.

$$z_j|\theta_d \sim \text{Multi}(\theta_d), \qquad (4)$$

Expression 4 assumes that that a variable z is derived by $\theta_d$. The variable z is for determining whether each work has a certain topic index. $\theta_d$ is a probability distribution indicating the topic in which a corresponding document is included.

$$w_{ji}|z_j,\phi \sim \text{Multi}(\phi_{z_j}), \qquad (5)$$

Expression 5 indicates that each word is generated in a topic distribution. Whether or not each word is generated in a certain topic distribution is determined by a topic index z.

In Expression 5, a set of words $W_{ji}$ of the j-th trajectory is based on multinomial distribution using $\phi_{dji} \in R^k$ as a parameter (R denotes an R dimension).

$$v_{ji\tau}|z_j,w_{ji},\mu,\Sigma \sim N(\mu_{w_{ji}z_j\tau}, \Sigma_{w_{ji}z_j\tau}), \qquad (6)$$

In Expression 6, a vector difference $v_{ji\tau}$ included in each word has Gaussian distribution and is expressed in the form of $N(\mu,\Sigma)$. The vector difference $v_{ji\tau}$ may also indicate a velocity.

However, when trajectories extracted using a KLT tracing technique are deformed into a form that may be used in an online learning method by using Expressions 1 to 6 above, hidden variables may not be inferred using the deformed input. In the online learning method based on the probabilistic topic model illustrated in FIG. 6, an integral is not defined, and thus the hidden variables may not be inferred.

In the exemplary embodiment of the present disclosure, in order to solve such a problem, an approximation method such as a sampling method is additionally applied to the online learning method based on the probabilistic topic model as illustrated in FIG. 6.

Figure 8A:
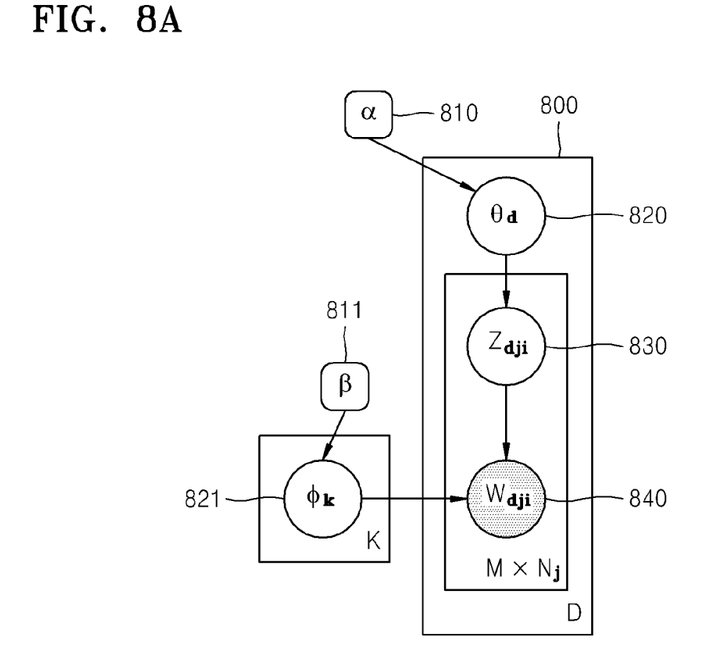
FIGS. 8A to 8C are diagrams illustrating an example of a cascade inference method, according to an exemplary embodiment of the present disclosure.

In the exemplary embodiment of the present disclosure, as an example of the approximation method, a cascade inference method is used. FIGS. 8A to 8C illustrate an example of a cascade inference method, according to an exemplary embodiment of the present disclosure.

In the exemplary embodiment of the present disclosure, three steps of the cascade inference method are used. Hidden variables are inferred in each step by being used as observation values in the next step.

The three steps of the cascade inference method are as follows:

1. A step of clustering positions of trajectories for each topic in a document.
2. A step of ascertaining a spatiotemporal correlation between topics.
3. A step of modeling movement patterns, which are not quantized, in a Gaussian form, by using information on the clustered trajectories as observation values.

Referring to FIG. 8A, values of parameter probability vectors $\theta_d$ 820 and $\phi_k$ 821 of multinomial distribution, which indicate histogram distribution of topics in a document, are inferred through the step of clustering positions of trajectories for each topic in a document. A spatiotemporal correlation between the topics is ascertained by using the inferred observation values of $\theta_d$ 820 and $\phi_k$ 821. General movement patterns are ascertained through the process of ascertaining the spatiotemporal correlation between the topics.

Thereafter, movement patterns, which are not quantized, are expressed in a Gaussian form by using, as an observation value, an information value $z_{dji}$ 830 of a topic including words. Thus, learning is performed. The probability of the trajectories included in each frame being present within a pre-learned movement pattern is calculated using a result of the learning in a Gaussian form, and thus the trajectories having a low probability may be determined to be abnormal trajectories.

Each of the above-mentioned steps will be described in detail as follows:

1. A step of clustering positions of trajectories for each topic in a document.

Figure 9A:
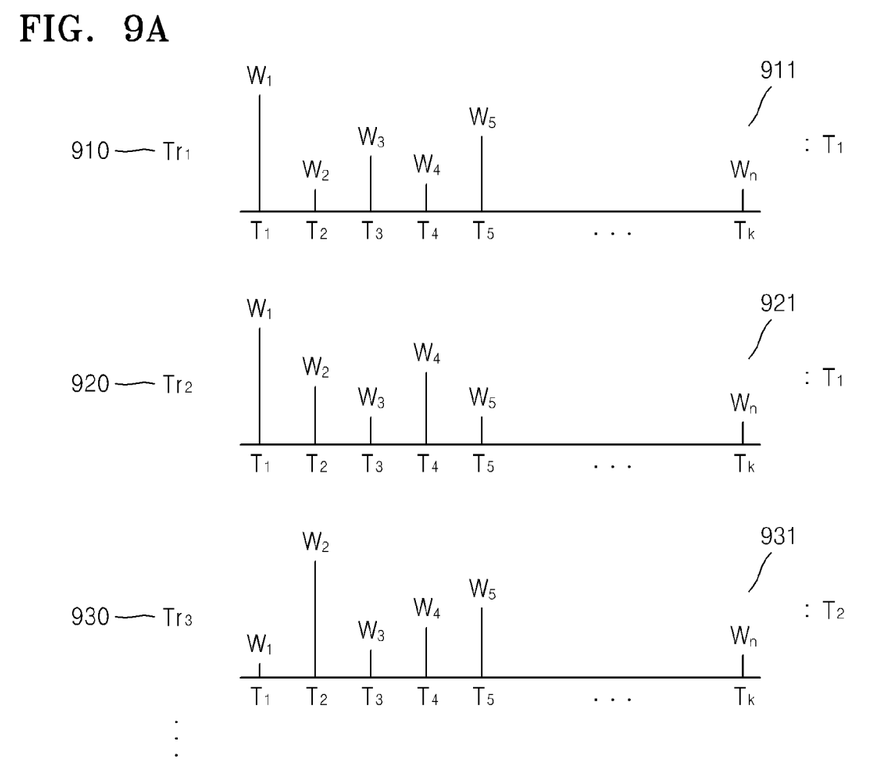
FIGS. 9A and 9B are diagrams illustrating an example in which positions of trajectories are clustered for each topic, according to an exemplary embodiment of the present disclosure.
Figure 9B:
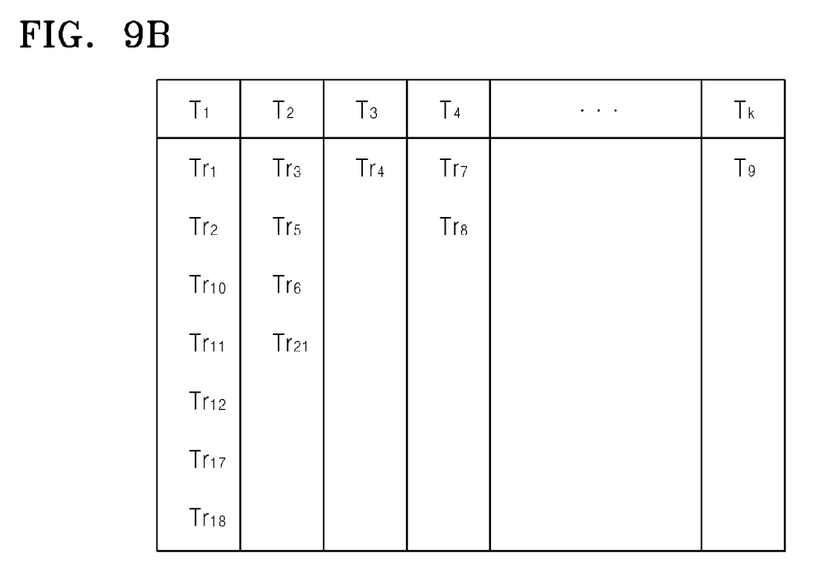

First, as illustrated in FIG. 8A, a coupling probability between a document-topic distribution $\theta_d$ 820, a topic $z_{dji}$ 830, and a word $w_{dji}$ 840 is ascertained. A probability distribution is approximated by indicating whether $N_j$ words $w_{ji}$ 740 (See FIG. 7), which are included in M trajectories in a document 800, are included in a certain topic $z_{dji}$ 830. Then, hidden variable values of the document-topic probability distribution $\theta_d$ 820 and the topic-word probability distribution $\phi_k$ 821 may be inferred by using a cascade inference method. In this manner, the positions of the trajectories may be clustered for each topic. Below, FIGS. 9A and 9B are used to describe clustering of the positions of the trajectories for each topic.

Referring to FIG. 8A, when a dirichlet parameter a 810 and a dirichlet parameter β 811 are given by Expressions 2 and 3, a coupling probability between the document-topic distribution $\theta_d$ 820, the topic $z_{dji}$ 830, and the word $w_{dji}$ 840 is as expressed by Expression 7.

A document is constituted by a plurality of topics which are generated by multinomial distribution. The probability distribution of the topics in the document is associated with the parameter probability vector $\theta_d$ of the multinomial distribution which is generated by each state $s_d$. Here, the parameter probability vector $\theta_d$ 820 and the parameter probability vector $\phi$ 821 of the multinomial distribution express a histogram distribution of the topics in the document.

$$p(\phi, \theta_d, \{z_{dji}\}, \{w_{dji}\} \mid \alpha, \beta) = \qquad (7)$$
$$p(\theta_d \mid \alpha) p(\phi \mid \beta) \prod_{i,j} p(z_{dji} \mid \theta_d) p(w_{dji} \mid z_{dji}, \phi),$$

In Expression 7, $\phi$ denotes the topic-word probability distribution 821, the document-topic distribution probability distribution $\theta_d$ 820 denotes distribution of the topics in the document, the $z_{dji}$ 830 denotes a topic, and the $w_{dji}$ 840 denotes a word. In this case, a subscript d is an identifier for identifying the document, and j∈{1,2, ..., M} denotes an index of trajectories included in a document where M is the number of trajectories in a document.

In Expression 7, an inference is performed through an OLDA learning method using VB. In this process, a variational distribution with respect to latent variables is set as expressed by Expression 8. The latent variables refer to all variables that may not be actually observed in a probabilistic model.

$$q(\{\phi_k\}, \{z_{dji}\}, \{\theta_d\} \mid \lambda, \varphi, \gamma) = \qquad (8)$$
$$\prod_{k=1}^{K} \text{Dirichlet}(\phi_k \mid \lambda_k) \prod_{d=1}^{D} q(\theta_d \mid \gamma_d) \prod_{i,j}^{N_{dj}, M} q(z_{dji} \mid \varphi_{dji}),$$

In Expression 8, γ,φ,λ denote variational parameters that are used to approximate Expression 7. In Expression 8, it is assumed that variables, which were conditionally dependent on each other in the past, are independent from each other. The variational parameters γ,φ,λ are inferred using a method of approaching a lower limit of a log-likelihood value of information into which a trajectory to be input is converted. In this manner, it may be seen whether words in each trajectory have a certain topic. The inference is performed by changing the values of γ,φ,λ, making Expression 8 approximately be Expression 7.

Thereafter, in the exemplary embodiment of the present disclosure, clustering is performed by forming a histogram between the word $w_{dji}$ 840 and the topic $z_{dji}$ 830 for every M trajectories in the document 800, and by determining the topic of the trajectories using a mode. In this process, a number of errors may be minimized by using the mode.

FIGS. 9A and 9B are diagrams illustrating an example in which positions of trajectories are clustered for each topic.

Referring to FIG. 9A, probability distributions 911, 921, and 931 of topics in which words are included respectively for trajectories Tr1 910, Tr2 920, Tr3 930, . . . are ascertained. Then, a topic that is most likely to occur is determined for each trajectory, for example, a first topic T1 in the trajectory Tr1 910, a first topic T1 in the trajectory Tr2 920, and a second topic T2 in the trajectory Tr3 930. In this manner, topics with respect to all trajectories of an input image are analyzed.

Then, the trajectories are clustered for each topic, as illustrated in FIG. 9B.

For example, the clustering is performed such that trajectories in which the first topic T1 is highly likely to occur are Tr1, Tr2, Tr10, Tr11, Tr12, Tr17, and Tr18, that trajectories in which the second topic T2 is highly likely to occur are Tr3, Tr5, Tr6, and Tr21, that trajectories in which the third topic T3 is highly likely to occur is Tr4, that trajectories in which the fourth topic T4 is highly likely to occur are Tr7 and Tr8, and that a trajectory in which a k-th topic Tk is highly likely to occur is Tr9.

2. A step of ascertaining a spatiotemporal correlation between topics.

FIGS. 5 and 6 describe the basic concept for ascertaining a spatiotemporal correlation between topics.

Figure 8B:
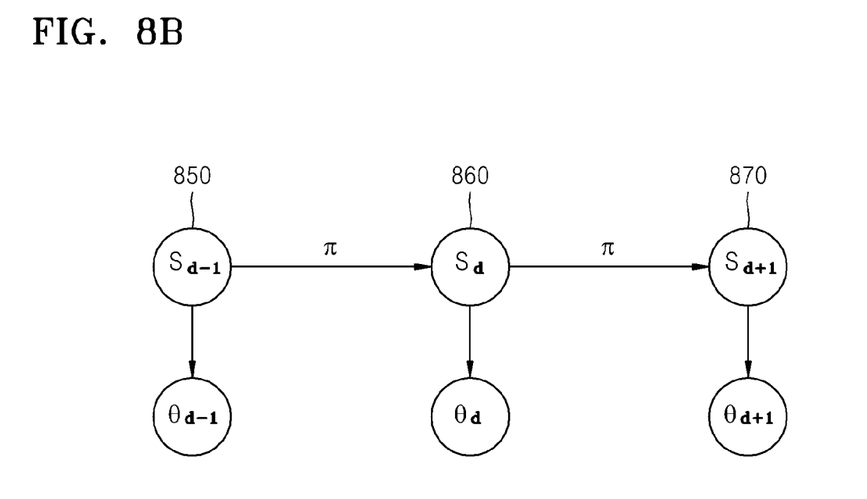
Figure 8C:
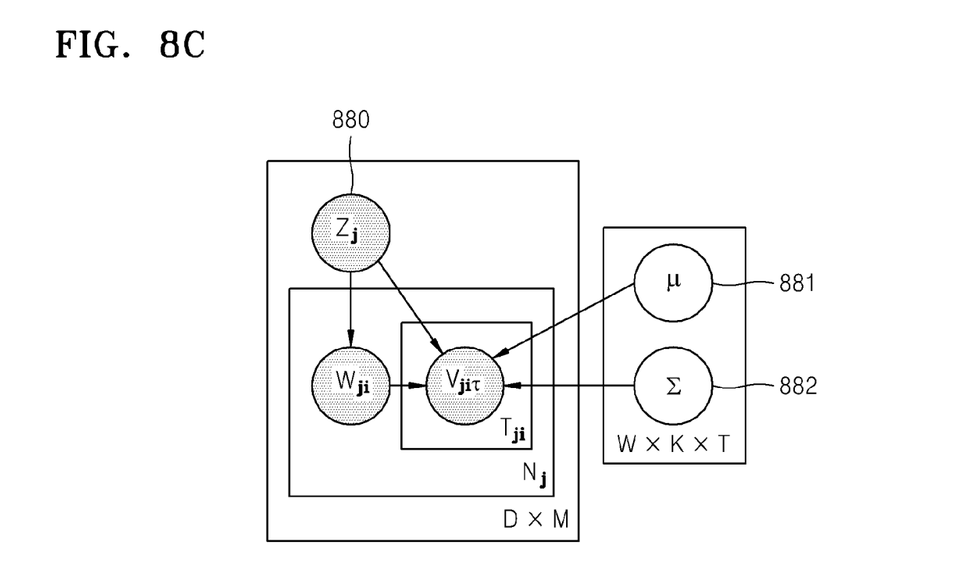

FIG. 8B is a conceptual diagram of a model for ascertaining a spatiotemporal correlation between topics. The probability distribution illustrated in FIG. 8B is associated with a multinomial distribution parameter $\theta_d$ that is generated by a state $s_d$. In this case, each state $s_d$ denotes a set of behavior topics that occur in each time. Accordingly, when a transition state according to time is ascertained, it may be ascertained what behaviors occur mainly in each time.

In this step, a transition state between states is ascertained using the multinomial distribution parameter $\theta_d$ ascertained in the step of clustering the positions of the trajectories in the document for each topic, in order to ascertain a spatiotemporal correlation between the topics.

In this process, a minimum state group for ascertaining the spatiotemporal correlation is selected using a K-means clustering method.

In the step of ascertaining the spatiotemporal correlation between the topics, $\theta_d$ denotes a K-dimensional vector. The K-dimensional vector is assumed by referring to probabilities of given K topics occurring as one element.

When D histograms $\{\theta_d\}_{d=1}^D$ are given, the histograms are divided into Nc groups $\{C_1, C_2, \ldots, C_{NC}\}$. Nc is a design parameter that denotes a number of states. The number of Nc groups to be selected in order to ascertain the spatiotemporal correlation is set as a minimum value of Expression 9. In general, a number between 2 and 3 is selected.

$$\underset{\{C_n\}_{n=1}^{N_c}}{\mathrm{argmin}} \sum_{n=1}^{N_c} \sum_{\overline{\theta}_d \in C_n} \|\overline{\theta}_d - m_n\|^2 \qquad (9)$$

In Expression 9, an average of vectors in a set $C_n$ is defined as $m_n$, and $\{\overline{\theta}_d\}$ denotes a result of normalization of $\{\overline{\theta}_d\}$ for each K-dimension indicating a number of topics. In the exemplary embodiment of the present disclosure, $\{s_d\}$ and $\{\theta_d\}$ are calculated by performing K Means-clustering in order to minimize the value of Expression 9. In this case, a value of K is a value of Nc. In addition, $\{s_d\}$ denotes a clustering index of the corresponding multinomial distribution parameter $\theta_d$. In this case, $s_d$ has information on which topic occurs mainly.

As an exemplary embodiment of the present disclosure, when Nc is 3, a group selected to ascertain a spatiotemporal relationship is represented as illustrated in FIG. 8B. In FIG. 8B, $s_{d-1}$ 850 denotes a previous state, $s_d$ 860 denotes a current state, and $s_{d+1}$ 870 denotes an immediate state. The model illustrated in FIG. 8B is configured in a similar form to a hidden Markov model.

In addition, each state (for example, $s_d$) transitions to another state (for example, $s_{d-1}$ or $s_{d+1}$) in a similar form to a hidden Markov model by a transition probability matrix Π.

The hidden Markov model is a model on the assumption that observation occurs in a state of a Markov chain. At this time, states constituting the Markov chain are not actually observed.

As an exemplary embodiment of the present disclosure, a parameter $m_n$ defined as described above refers to general movement patterns, such as movement $m_1$ of vehicles moving in a horizontal direction or movement $m_2$ of vehicles moving in a vertical direction, which are bound on the basis of a spatiotemporal correlation of behaviors in an image. A set $\{s_d\}$ of state indexes denotes a variation in a state in an image which occurs as time passes.

As an exemplary embodiment of the present disclosure, an online learning method may be adapted to a variation in an image by using a size of a sliding window which is designated in order to use a gradual learning method. The size of the sliding window is associated with a size of a mini batch of OLDA.

3. A step of modeling movement patterns, which are not quantized, in a Gaussian form, by using information on the clustered trajectories as observation values.

In this step, a result of modeling movement patterns for each topic is obtained. Positions of trajectories before t1 . . . $t_T$ time which pass through grids constituting an image are stored in the form of a single Gaussian model.

FIG. 8C is a conceptual diagram for modeling movement patterns, which are not quantized, in a Gaussian form, by using information $Z_j$ 880 of the clustered trajectory as an observation value. In the exemplary embodiment of the present disclosure, behavior patterns are ascertained for each cell on the assumption that pixels of adjacent positions have a similar behavior pattern.

$$\mu_{w_j \in f^t} = (1-\rho_t)\mu_{w_j \in f^t} + \rho_t v_{jt\tau}, \qquad (10)$$

Expression 10 is an expression representing an incremental updating of a Gaussian model. When a new value is input to Expression 10, a mean and a covariance are updated.

In Expression 10, ρ denotes a learning rate. A mean value of a square is updated as expressed by Expression 11 in order to learn a covariance.

$$Z_{w_j \in f^t} = (1-\rho_t)Z_{w_j \in f^t} + \rho_t v_{jt\tau} v_{jt\tau}^T, \qquad (11)$$

A covariance matrix may be obtained as expressed by Expression 12 by using a result of Expression 11.

$$\Sigma_{w_j \in f^t} = Z_{w_j \in f^t} - \mu_{jt\tau}\mu_{jt\tau}^T, \qquad (12)$$

Expression 12 is an expression for incrementally updating a signal.

In the exemplary embodiment of the present disclosure, behaviors and correlations, which occur for each topic (each movement pattern), are modeled in the form of a probability distribution by using the above-mentioned expression. Accordingly, behaviors that have a high probability value due to the probability distribution are classified as normal behaviors, and those that do not are classified as abnormal behaviors, among behaviors to be input to the movement pattern online learning unit 130.

As described above, according to the one or more of the above exemplary embodiments of the present disclosure, in a complex situation such as an intersection, main movements of objects, such as a human, in an image are learned, and abnormal behaviors occurring in the image may be automatically searched for on the basis of a learning model. In addition, a function of detecting abnormal behaviors may be performed without regard to a type of traffic situation. This function is used, for example, to automatically detect abnormal behaviors in various real-time surveillance situations. When this function is used in a traffic situation surveillance system, a situation of a traffic violation, such as jaywalking or an illegal U-turn, may be automatically detected as abnormal behavior. In addition, behaviors having a low occurrence frequency in an image may also be detected as abnormal behaviors in other surveillance situations.

In particular, according to a method and apparatus for detecting an abnormal movement, learning may be performed even when a plurality of normal movement patterns occur with a time difference in an arbitrary local area of an image. In addition, a velocity and direction information of an object that passes through each position of an image, and a spatiotemporal relationship between movement patterns may be ascertained. Furthermore, the method and apparatus may be adapted to a variation in an image according to time variation, and have a robust performance even for a complex image, such as a crowd concentration image.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. An apparatus for detecting an abnormal movement, the apparatus comprising:
    at least one processor;
    a feature tracing unit executed or controlled by the processor to extract features of a moving object in an input image, trace a variation in a position of the extracted features according to time, and ascertain trajectories of the extracted features;
    a topic online learning unit executed or controlled by the processor to classify the input image in units of documents that are bundles of the trajectories expressed by a set of words representing positions of grid points through which the trajectories pass and a set of vector differences representing a set of differences in vectors between a position of an actual feature in a current frame and a position of an actual feature in a previous frame, and ascertain, by using an online learning method which is a probabilistic topic model, probability distribution states of topics included in a classified document; and
    a movement pattern online learning unit executed or controlled by the processor to learn a velocity and a direction for each of the ascertained topics, and learn a movement pattern by inferring a spatiotemporal correlation between the ascertained topics by using a K-means clustering method.

2. The apparatus of claim 1, further comprising an abnormality detecting unit configured to classify the movement pattern, in response to the trajectories comprised in each frame of the input image having a low probability of being included in the learned movement pattern, as an abnormal movement pattern by using a Gaussian learning result of the learned movement pattern.

3. The apparatus of claim 1, wherein the feature tracing unit is configured to extract features of a moving object in an input image by using a Kanade-Lucas-Tomasi (KLT) tracing technique.

4. The apparatus of claim 1, wherein in the topic online learning unit, the document includes a plurality of topics which are generated by multinomial distribution, and a multinomial distribution parameter probability vector value indicating a probability distribution state of the plurality of topics constituting the document is inferred to cluster positions of the trajectories for each topic.

5. The apparatus of claim 1, wherein the multinomial distribution parameter probability vector value indicating a probability distribution state of the plurality of topics constituting the document comprises probability distribution ($\theta_d$) and topic-word probability distribution ($\phi_k$).

6. The apparatus of claim 1, wherein the trajectory is expressed by a set of words $w_{ji}$ and a set of vector differences $v_{jiT}$, and
    wherein $w_{ji}$ indicates that a j-th trajectory passes through an i-th grid, and the set of vector differences represents a set of differences $v_{jiT}$ in vectors between a position of an actual feature in the word and a position of the actual feature before T frames.

7. The apparatus of claim 6, wherein the word $w_{ji}$ is based on multinomial distribution, and the difference $v_{ji\tau}$ in vectors comprised in the words has Gaussian distribution.

8. The apparatus of claim 6, wherein a velocity is ascertained for each work position by using a position value of a current frame of a specific grid and an actual position value of the specific grid before $\tau$ frames.

9. The apparatus of claim 1, wherein the online learning method is an online latent dirichlet distribution (OLDA) learning method.

10. The apparatus of claim 9, wherein in the OLDA learning method, LDA is inferred using variational bayes (VB).

11. An apparatus for detecting an abnormal movement, the apparatus comprising:
    at least one processor;
    a feature tracing unit executed or controlled by the processor to extract features of a moving object in an input image, trace a variation in a position of the extracted features according to time, and ascertain trajectories of the extracted features;
    a trajectory classifying unit executed or controlled by the processor to classify the input image in units of documents indicating a bundle of the trajectories expressed by a set of words representing positions of grid points through which the trajectories pass and a set of vector differences representing a set of differences in vectors between a position of an actual feature in a current frame and a position of an actual feature in a previous frame, and infer, by using an online learning method which is a probabilistic topic model, a multinomial distribution parameter probability vector value indicating histogram distribution of topics constituting each document in order to cluster positions of the trajectories for each topic in the document;
    a spatiotemporal correlation inferring unit executed or controlled by the processor to infer a spatiotemporal correlation on the basis of the inferred multinomial distribution parameter probability vector value; and
    a movement pattern online learning unit executed or controlled by the processor to learn a velocity and a direction for each of the clustered topics, and learn a movement pattern by inferring a spatiotemporal correlation between the ascertained topics by using a K-means clustering method.

12. The apparatus of claim 11, further comprising an abnormality detecting unit configured to classify the movement pattern, in response to the trajectories comprised in each frame of the input image having a low probability of being comprised in the learned movement pattern, as an abnormal movement pattern by using a Gaussian learning result of the learned movement pattern.

13. The apparatus of claim 11, wherein the multinomial distribution parameter probability vector value comprises probability distribution ($\theta_d$) and topic-word probability distribution ($\phi_k$).

14. The apparatus of claim 11, wherein the trajectory is expressed by a set of words $w_{ji}$ and a set of vector differences $v_{jiT}$, and
    wherein $w_{ji}$ indicates that a j-th trajectory passes through an i-th grid, and the set of vector differences represents a set of differences $v_{jiT}$ in vector between a position of an actual feature in the word and a position of the actual feature before T frames.

15. The apparatus of claim 14, wherein the word $w_{ji}$ is based on multinomial distribution, and the difference $v_{ji\tau}$ in vectors comprised in the words has Gaussian distribution.

16. The apparatus of claim 14, wherein a velocity is ascertained for each work position by using a position value of a current frame of a specific grid and an actual position value of the specific grid before $\tau$ frames.

17. The apparatus of claim 11, wherein the feature tracing unit is configured to extract features of the moving object in the input image by using a Kanade-Lucas-Tomasi (KLT) tracing technique.

18. The apparatus of claim 11, wherein the online learning method is an online latent dirichlet distribution (OLDA) learning method.

19. A method of detecting an abnormal movement, the method comprising:
- extracting, using a processor, features of a moving object in an input image;
- tracing a variation in position of the extracted features according to time;
- ascertaining trajectories of the extracted features;
- classifying the input image in units of documents that are bundles of the trajectories expressed by a set of words representing positions of grid points through which the trajectories pass and a set of vector differences representing a set of differences in vectors between a position of an actual feature in a current frame and a position of an actual feature in a previous frame;
- ascertaining probability distribution states of topics, which constitute a classified document, by using an online learning method which is a probabilistic topic model;
- learning a velocity and a direction for each of the ascertained topics; and
- learning a movement pattern by inferring a spatiotemporal correlation between the ascertained topics by using a K-means clustering method.

20. The method of claim 19, further comprising classifying the moment pattern, in response to the trajectories comprised in each frame of the input image having a low probability of being comprised in the learned movement pattern, as an abnormal movement pattern by using a Gaussian learning result of the learned movement pattern.

21. A method of detecting an abnormal movement, the method comprising:
- extracting, using a processor, features of a moving object in an input image;
- tracing a variation in position of the extracted features according to time;
- ascertaining trajectories of the extracted features;
- classifying the input image in units of documents indicating a bundle of the trajectories expressed by a set of words representing positions of grid points through which the trajectories pass and a set of vector differences representing a set of differences in vectors between a position of an actual feature in a current frame and a position of an actual feature in a previous frame;
- inferring, by using an online learning method which is a probabilistic topic model, a multinomial distribution parameter probability vector value indicating histogram distribution of topics constituting each document in order to cluster positions of the trajectories for each topic in the document;
- inferring a spatiotemporal correlation on the basis of the inferred multinomial distribution parameter probability vector value;
- learning a velocity and a direction for each of the clustered topics; and
- learning a movement pattern by inferring a spatiotemporal correlation between the ascertained topics by using a K-means clustering method.

\* \* \* \* \*